US012722392B2

(12) United States Patent
Watanabe et al.

(10) Patent No.: US 12,722,392 B2
(45) Date of Patent: Sep. 1, 2026

(54) DEGASSING DEVICE AND INKJET RECORDING APPARATUS

(71) Applicant: KYOCERA Document Solutions Inc., Osaka (JP)

(72) Inventors: Takeshi Watanabe, Osaka (JP); Yoshihiro Yamagishi, Osaka (JP); Hideki Ishida, Osaka (JP); Hiroaki Watanabe, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 197 days.

(21) Appl. No.: 18/810,312

(22) Filed: Aug. 20, 2024

(65) Prior Publication Data

US 2026/0054493 A1 Feb. 26, 2026

(51) Int. Cl.
*B41J 2/19* (2006.01)
*B41J 2/175* (2006.01)
*B41J 2/18* (2006.01)

(52) U.S. Cl.
CPC ............. *B41J 2/19* (2013.01); *B41J 2/17596* (2013.01); *B41J 2/18* (2013.01); *B41J 2202/07* (2013.01)

(58) Field of Classification Search
CPC ... B41J 2/19; B41J 2/17596; B41J 2/18; B41J 2202/07; B41J 2/175
USPC ............................................................ 347/92
See application file for complete search history.

(56) References Cited

U.S. PATENT DOCUMENTS

2010/0103233 A1* 4/2010 Akatsuka .................. B41J 2/19 347/92
2011/0168017 A1* 7/2011 Lamers ............. B01D 19/0047 95/260
2017/0182788 A1* 6/2017 Tokimatsu ........... B41J 2/17596
2019/0030908 A1* 1/2019 Maeshima ........... B41J 2/17566
2019/0263135 A1 8/2019 Abe et al.

FOREIGN PATENT DOCUMENTS

JP 2019-142189 A 8/2019

* cited by examiner

*Primary Examiner* — Jason S Uhlenhake
*Assistant Examiner* — Alexander D Shenderov
(74) *Attorney, Agent, or Firm* — Studebaker Brackett PLLC

(57) ABSTRACT

A degassing device removes air dissolved in liquid under a pressure decreased atmosphere. The degassing device includes a liquid tank, a pressure decreasing device, a dipping member, and a lifting device. The liquid tank stores the liquid. The pressure decreasing device decreases pressure in the liquid tank. The dipping member is dipped in the liquid in the liquid tank. The lifting device lifts and lowers the dipping member in a dipping state where the dipping member is positioned on a liquid surface of the liquid in the liquid tank and a retracted state where the dipping member is retracted from the liquid surface of the liquid tank.

9 Claims, 15 Drawing Sheets

DEGASSING DEVICE AND INKJET RECORDING APPARATUS

BACKGROUND

The present disclosure relates to a degassing device and an inkjet recording apparatus.

In an inkjet recording apparatus, when an amount of dissolved gas of ink increases, bubbles may be generated inside a recording head, causing an ejection failure. Therefore, a technique for decreasing an amount of the dissolved gas in the ink has been studied. For example, there has been proposed a configuration in which a pressure inside an ink tank is decreased to degas the ink.

In the above-described configuration, in order to suppress re-dissolution of the air into the ink in the ink tank, a floating body is floated on the liquid surface. However, in the configuration, because the surface area is narrowed owing to the floating body, a degassing efficiency is lowered.

SUMMARY

A degassing device according to the present disclosure removes air dissolved in liquid under a pressure decreased atmosphere. The degassing device includes a liquid tank, a pressure decreasing device, a dipping member, and a lifting device. The liquid tank stores the liquid. The pressure decreasing device decreases pressure in the liquid tank. The dipping member is dipped in the liquid in the liquid tank. The lifting device lifts and lowers the dipping member in a dipping state where the dipping member is positioned on a liquid surface of the liquid in the liquid tank and a retracted state where the dipping member is retracted from the liquid surface of the liquid tank.

An inkjet recording apparatus according to the present disclosure includes the degassing device, and a recording head which ejects the liquid degassed by the degassing device, to a sheet.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Figure 1:
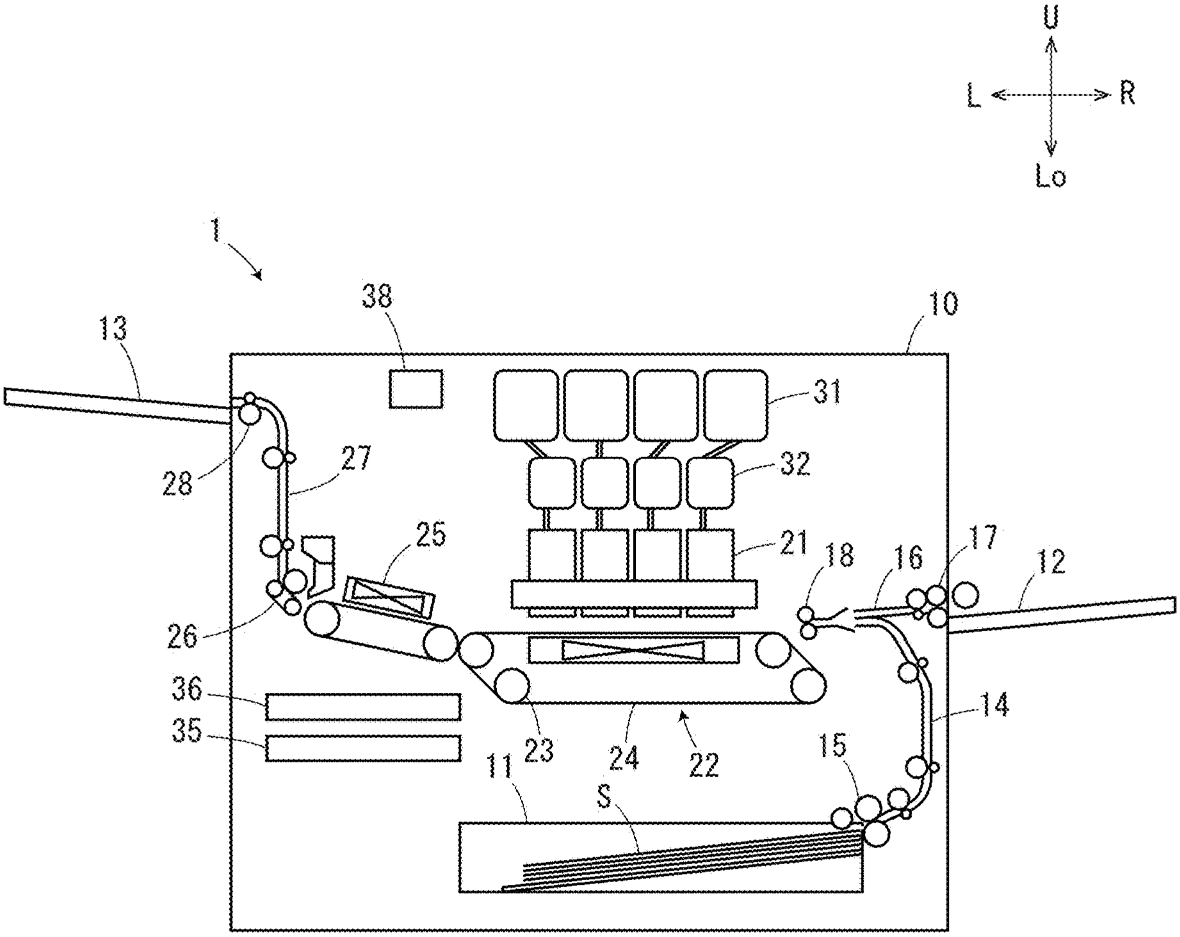
FIG. 1 is a schematic view showing an inkjet recording apparatus according to one embodiment of the present disclosure.

Hereinafter, with reference to the drawings, an inkjet recording apparatus 1 of the present embodiment will be described. FIG. 1 is a schematic view showing the inkjet recording apparatus 1 according to the present embodiment. For convenience of explanation, the front side of the paper surface on which FIG. 1 is drawn is defined as the front side of the inkjet recording apparatus 1, and the left-and-right direction will be described with reference to the direction in which the inkjet recording apparatus 1 is viewed from the front side. The arrows L, R, U, and Lo attached to each figure indicate the left, right, upper, and lower sides of the inkjet recording apparatus 1, respectively.

An inkjet recording apparatus 1 ejects ink from each inkjet recording head 21 toward a sheet S as a recording medium and performs printing. The inkjet recording apparatus 1 includes a box-shaped housing 10 in which various kinds of device are housed. In the lower portion of the housing 10, a sheet feeding cassette 11 in which the sheet S is set is housed, and a manual sheet feeding tray 12 on which the sheet S is set by hand is installed on the right side surface of the housing 10. On the upper portion of the left side surface of the housing 10, a sheet discharge tray 13 on which the recorded sheet S is stacked is installed.

In the right side portion in the housing 10, a first conveyance path 14 along which the sheet S is conveyed from the sheet feeding cassette 11 to the recording head 21 provided in the center of the housing 10 is formed. On the upstream side of the first conveyance path 14, a first sheet feeding part 15 which feeds the sheet S from the sheet bundle in the sheet feeding cassette 11 is provided, and a registration roller 18 which adjusts the feeding timing of the sheet S is provided in the downstream portion of the first conveyance path 14. Further, a sheet feeding path 16 of the manual sheet feeding tray 12 is merged with the downstream portion of the first conveyance path 14, and a second sheet feeding part 17 which feeds the sheet S from the sheet bundle on the manual sheet feeding tray 12 is provided on the sheet feeding path 16.

On the downstream side of the registration roller 18, a conveying device 22 and the recording head 21 provided for each color (for example, black, cyan, magenta, and yellow) are installed. The registration roller 18 corrects the skew of the sheet S and then sends the sheet S to the conveying device 22 in accordance with the ink ejecting operation by each recording head 21. In the housing 10, an ink container 31 and an ink tank 32 for each recording head 21 are provided. The ink of each ink container 31 is temporarily stored in the ink tank 32, the ink is degassed as necessary, and then the ink is supplied from the ink tank 32 to the recording head 21.

The conveying device 22 is constituted by winding a conveyance belt 24 around a plurality of tension rollers 23 installed below the recording heads 21. On the downstream side of the conveying device 22, a drying device 25 which dries the ink of the sheet S is provided. On the downstream side of the drying device 25, a decurl device 26 which corrects the curl generated on the sheet S by drying the ink is provided. On the downstream side of the decurl device 26, a second conveyance path 27 along which the sheet S is conveyed toward the sheet discharge tray 13 is formed. In the downstream portion of the second conveyance path 27, a sheet discharge part 28 which discharges the recorded sheet S to the sheet discharge tray 13 is provided.

Below the drying device 25, a maintenance unit 35 which cleans the recording heads 21 and a cap unit 36 which caps the recording heads 21 are provided. The maintenance unit 35 is provided with a squeegee-shaped wiping blade, and the wiping blade scrapes the ink remaining on the nozzle surface of the recording head 21. The cap unit 36 is provided with a head cap, and the nozzle surface of the recording head 21 is capped with the head cap. The head cap suppresses drying of the ink in the nozzle. The drying of the ink in the nozzle may be further suppressed by storing a liquid such as a cleaning liquid in the head cap.

Further, the inkjet recording apparatus 1 is provided with a control device 38 for controlling the entire apparatus. The control device 38 may be composed of a processor or a logic circuit (hardware) formed in an integrated circuit or the like. In the case of a processor, the processor reads and executes a program stored in a memory, and various processes are executed. For example, a CPU (Central Processing Unit) is used as the processor. The memory is constituted by one or more storage devices such as a ROM (Read Only Memory), a RAM (Random Access Memory) or the like depending on the application.

At the time of image recording, the sheet S is fed from the sheet feeding cassette 11 and the manual sheet feeding tray 12 by the first sheet feeding part 15 and the second sheet feeding part 17, respectively, and then sent to the registration roller 18. In accordance with the ejecting timing of the ink, the sheet S is conveyed from the registration roller 18 to the conveyance belt 24, the degassed ink is ejected from each recording head 21, and a color image is recorded on the surface of the sheet S. The sheet S is dried by the drying device 25, and the curl of the sheet S is corrected by the decurl device 26. The sheet S is conveyed to the sheet discharge part 28 through the second conveyance path 27, and the recorded sheet S is discharged to the sheet discharge tray 13 by the sheet discharge part 28.

By the way, the liquid surface of the ink exposes to the air in the ink tank 32, and the dissolving of the air proceeds, and the nozzle of the recording head 21 may be clogged by bubbles in the ink. Therefore, it is desired to appropriately keep an amount of the dissolved gas in the ink. For example, a method has been proposed in which by passing the ink through the hollow fiver filter in a state where the pressure of the circumference of the hollow fiber filter is decreased, the air is moved from the wall surface of the hollow fiber to the pressure decreased side to degas the ink. This method requires the expensive hollow fiber filter and requires periodic replacement operations, which increase cost.

In order to prevent the clogging of the nozzle, a method (hereinafter referred to as the stirring degassing method) has been proposed in which the ink is stirred by the stirrer in a state in which the pressure in the ink tank 32 is decreased below an atmospheric pressure to degas the ink. In the stirring degassing method, a magnetic force is externally applied to the stirrer in the ink tank 32, and the stirrer is rotated by the magnetic force to stir the ink in the ink tank 32. When the depth of the ink and the tank diameter are large, the ink is difficult to be stirred, and the degassing efficiency is lowered. As the rotational speed of the stirrer is increased, the stirring becomes easier, but when the rotational speed of the stirrer becomes too high, a detuning phenomenon occurs and the rotational sound of the stirrer becomes large. Therefore, in the present embodiment, a circulation degassing method shown below is adopted.

Figure 2:
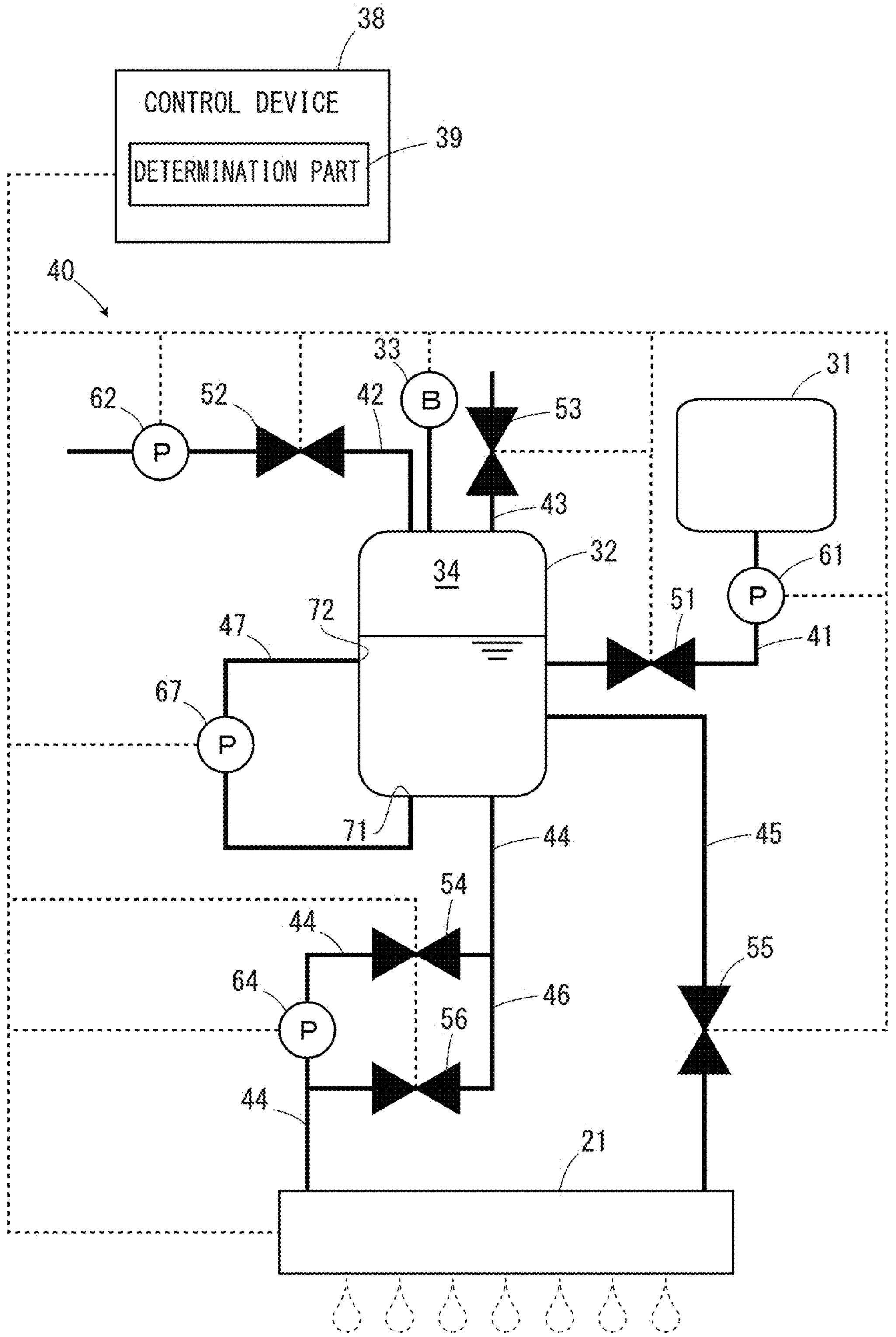
FIG. 2 is a schematic view showing an ink supply configuration according to the embodiment of the present disclosure.
Figure 3:
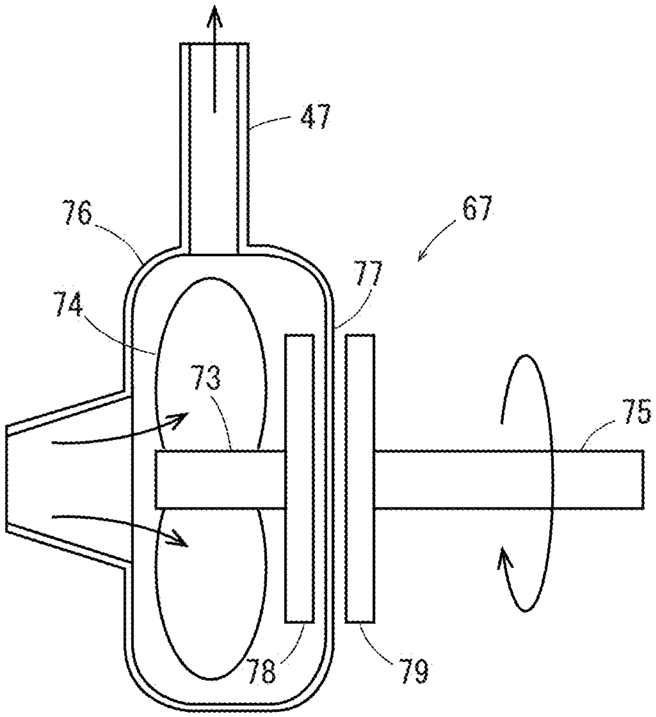
FIG. 3 is a schematic view showing a circulation pump according to the embodiment of the present disclosure.
Figure 4:
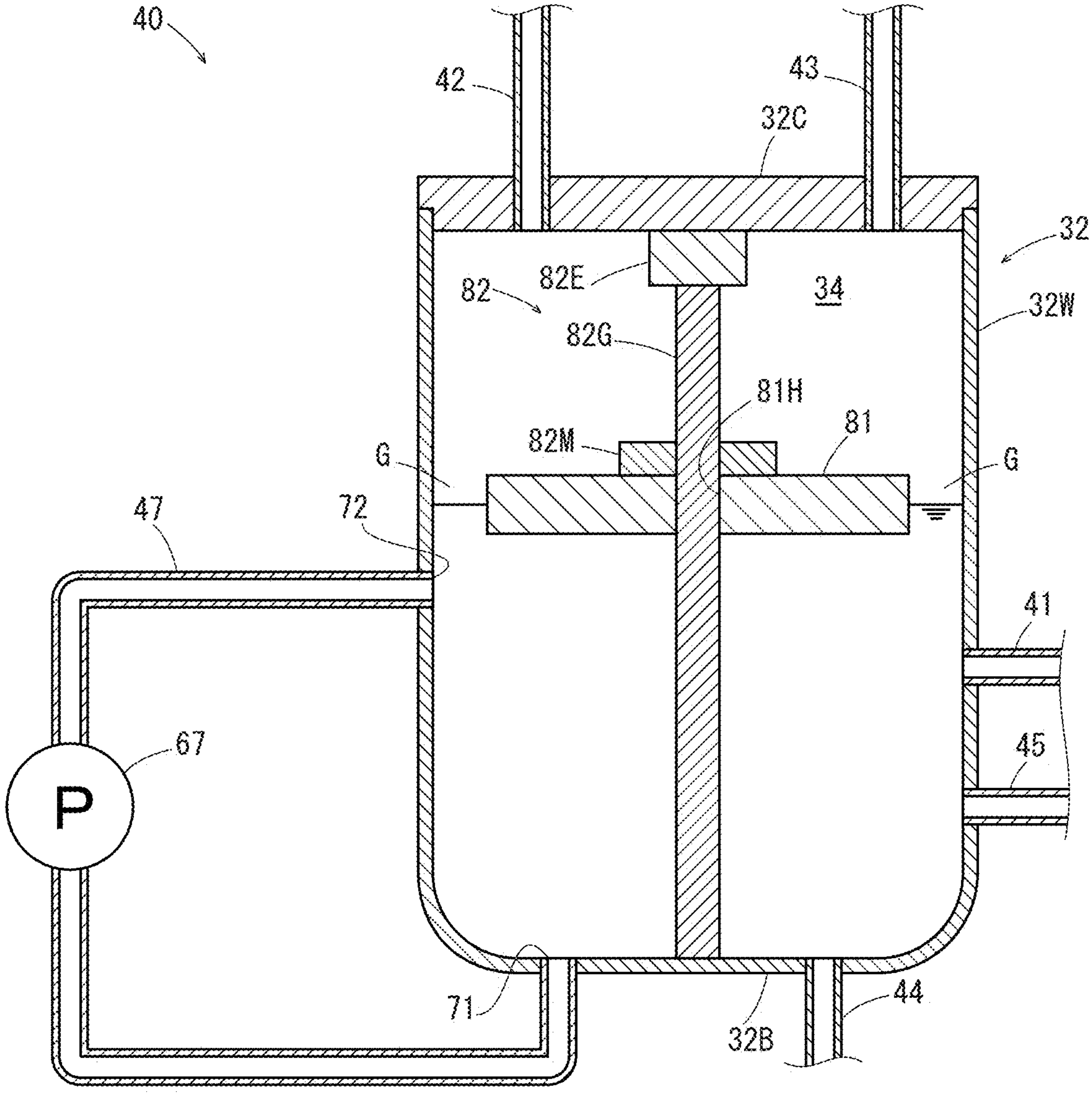
FIG. 4 is a sectional view schematically showing a degassing device according to the embodiment of the present disclosure.
Figure 5:
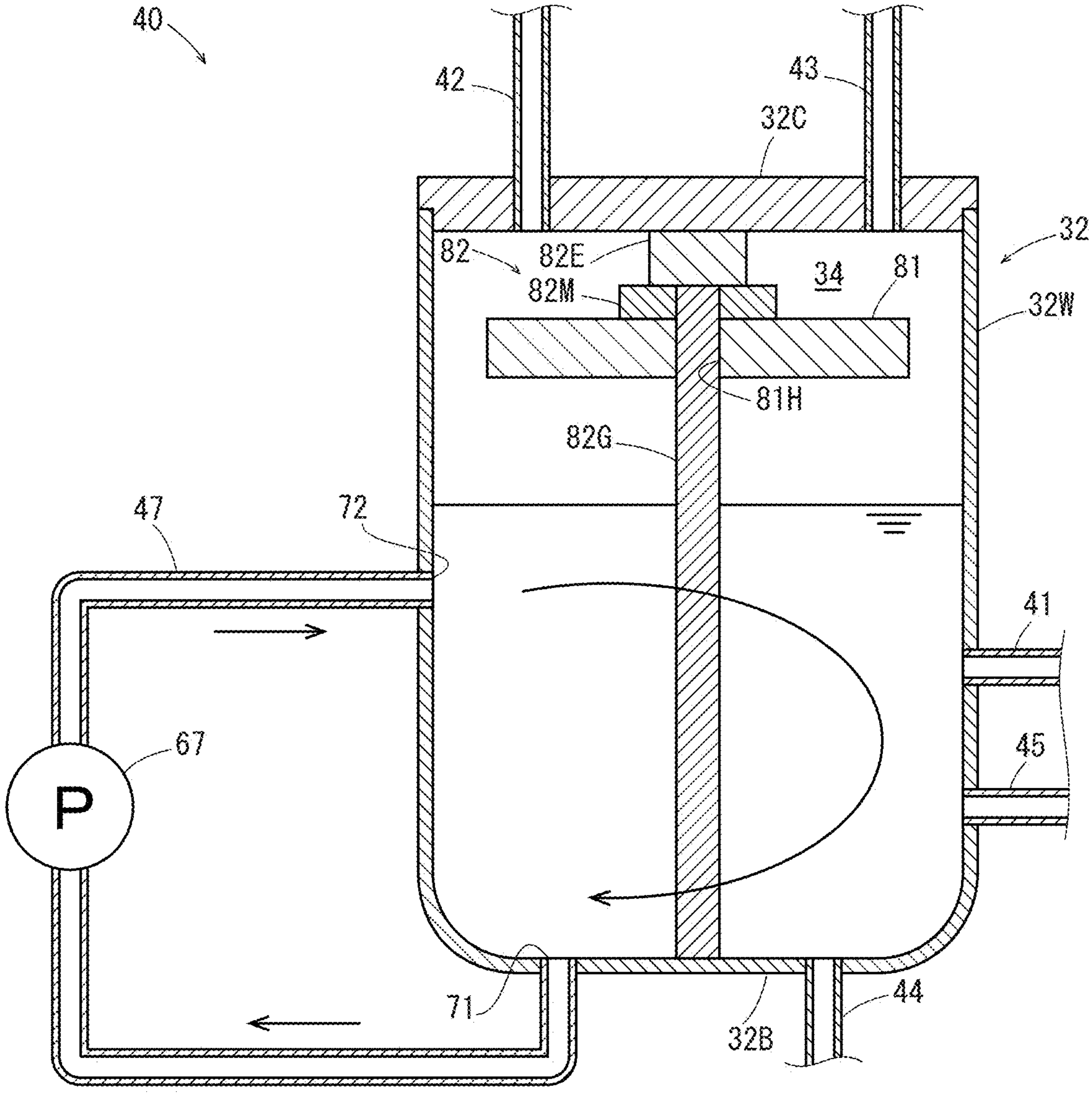
FIG. 5 is a sectional view schematically showing the degassing device according to the embodiment of the present disclosure.

[Degassing Device] A degassing device 40 according to this embodiment will be described. FIG. 2 is a schematic diagram showing an ink supply configuration according to the present embodiment. FIG. 3 is a schematic view showing a circulation pump 67 according to the present embodiment. FIG. 4 and FIG. 5 are cross-sectional views schematically showing the degassing device 40. Although the inkjet recording apparatus 1 according to the present embodiment is provided with the ink supply configuration for each color of the ink, one ink supply configuration will be described here because these ink supply configurations have the same structure.

[Ink Tank] The ink tank 32 has a cylindrical side wall portion 32W whose axial direction is along the upper-and-lower direction, a bottom portion 32B for closing the lower end portion of the side wall portion 32W, and a lid body portion 32C for closing the upper end portion of the side wall portion 32W. The horizontal cross section of the inner surface of the side wall portion 32W is preferably circular. Preferably, the side wall portion 32W and the bottom portion 32B are integrally formed.

[Replenishment Flow Pass] A replenishment flow pass 41 communicates with the ink container 31 and the ink tank 32. One end portion of the replenishment flow pass 41 is connected to the side wall portion 32W of the ink tank 32 below the liquid surface. On the replenishment flow pass 41, a replenishment pump 61 and a replenishment valve 51 are provided.

[Air Release Flow Pass] An air release flow pass 43 is connected to the lid body portion 32C, and communicates with the upper space 34 of the ink tank 32. On the air release flow pass 43, an air release valve 53 is provided.

[Pressure Decreasing Flow Pass] A pressure decreasing flow pass 42 is connected to the lid body portion 32C, and communicates with the upper space 34 of the ink tank 32. On the pressure decreasing flow pass 42, a pressure decreasing pump 62 and a pressure decreasing valve 52 are provided.

[Supply Flow Pass] A supply flow pass 44 communicates with the ink tank 32 and the recording head 21. One end portion of the supply flow pass 44 is connected to the bottom portion 32B of the ink tank 32. On the supply flow pass 44, a supply valve 54 and a supply pump 64 are provided.

[Recovery Flow Pass] A recovery flow pass 45 communicates with the ink tank 32 and the recording head 21. On the recovery flow pass 45, a recovery valve 55 is provided.

[Bypass Flow Pass] The supply flow pass 44 includes a bypass flow pass 46 bypassing the supply valve 54 and the supply pump 64. On the bypass flow pass 46, a bypass valve 56 is provided.

[Circulation Flow Pass] A circulation flow pass communicates with the vicinity of the bottom surface of the ink tank 32 and the vicinity of the liquid surface. The circulation flow pass 47 has an outlet port 71 through which the ink flows out from the ink tank 32 into the circulation flow pass 47, and an inlet port 72 through which the ink flows in from the circulation flow pass 47 into the ink tank 32. The outlet port 71 is connected to the bottom portion 32B of the ink tank 32, and the inlet port 72 is connected to the side wall portion 32W of the ink tank 32 at a portion near the liquid surface. That is, the inlet port 72 is positioned higher than the outlet port 71. On the circulation flow pass 47, a circulation pump 67 is provided. The ink is circulated via the circulation flow pass 47 by the circulation pump 67.

[Circulation Pump] Since the inside of the ink tank 32 is in a pressure decreased state during the degassing operation, a reciprocating pump such as a diaphragm type pump is easily affected by the decreased pressure. Therefore, it is preferable that the circulation pump 67 uses a pump that pumps the ink by a rotating body. For example, as the circulation pump 67, a non-positive displacement pump such as a centrifugal pump, an oblique flow pump, and an axial flow pump, or a positive displacement rotary pump such as a vane pump, a gear pump, and a screw pump may be used. By using these pumps, unlike the reciprocating pump, the influence of pressure decreasing in the ink tank 32 can be suppressed to circulate the ink.

In general, the recording head 21 may be included in the circulation flow pass 47 of the circulation degassing method, but in the present embodiment, the recording head 21 is not included in the circulation flow pass 47. That is, the circulation flow pass 47 is provided separately from the pass for supplying the ink to the recording head 21. Since the recording head 21 is not included in the circulation flow pass 47, the possibility that the meniscus formed in the nozzle of the recording head 21 is broken by the decreased pressure during the degassing and the outside air enters the recording head 21 can be reduced.

As shown in FIG. 3, a pump shaft 73 of the circulation pump 67 and a motor shaft 75 are disposed on both sides of a partition wall 77 so that power can be transmitted without contact. A pump casing 76 is formed in the middle of the circulation flow pass 47, and the pump shaft 73 attached with an impeller 74 is housed in the pump casing 76. A motor (not shown) is provided outside the circulation flow pass 47. Discs 78 and 79 are provided at the end portions of the pump shaft 73 and the motor shaft 75, and the discs 78 and 79 face each other across the partition wall 77 of the pump casing 76. Magnets (not shown) in which the S and N poles are alternately arranged in the circumferential direction are provided on opposite surfaces of the discs 78 and 79.

The pump shaft 73 and the motor shaft 75 are magnetically coupled (magnet coupling), and the power is transmitted from the motor shaft 75 to the pump shaft 73 using the magnetic force. The impeller 74 in the pump casing 76 can be rotated without penetrating the motor shaft 75 through the pump casing 76 while the pump casing 76 is kept in a liquid-tightly sealed state. Since the space between the discs 78 and 79 of the pump shaft 73 and the motor shaft 75 is partitioned by the partition wall 77 of the pump casing 76, even if a pressure difference between the inside and the outside of the pump casing 76 occurs when the pressure of the ink tank 32 is decreased, the ink leakage caused by the pressure difference is surely prevented.

[Control Device] The replenishment pump 61, the pressure decreasing pump 62, the supply pump 64, the circulation pump 67, the replenishment valve 51, the pressure decreasing valve 52, the air release valve 53, the supply valve 54, the recovery valve 55, and the bypass valve 56 are controlled by the control device 38 (see FIG. 1). The control device 38 includes a determination part 39 which determines the necessity of the degassing operation in accordance with a leaving time of the ink. When the determination part 39 determines that degassing of the ink is unnecessary, the degassing operation is not performed. Even if the air is dissolved again by leaving the ink, the ink can be used without the degassing within the allowable time.

[Barometer] The ink tank 32 is provided with a barometer 33 which measures an atmospheric pressure in the upper space 34 of the ink tank 32. The control device 38 acquires atmospheric pressure data from the barometer 33.

Next, the basic operation of the degassing device 40 will be described. Here, the standby state will be described as an initial state.

[Standby State] In the standby state, the replenishment valve 51, the pressure decreasing valve 52, and the supply valve 54 are closed, and the air release valve 53, the recovery valve 55, and the bypass valve 56 are opened. The ink is stored in the ink tank 32, the liquid surface is exposed to the air in the upper space 34 opened to the atmosphere, and then the air is dissolved in the ink with the lapse of time.

In the standby state, the determination part 39 of the control device 38 determines whether the degassing is necessary. For example, the control device 38 is provided with a timer, and the leaving time of the ink is measured by the timer. An amount of dissolved gas of the ink can be estimated from one or more parameters such as an atmospheric pressure, a temperature of the ink, and an elapsed time from the last printing. Therefore, the determination part 39 stores conversion information indicating a correspondence relationship between each parameter and the amount of dissolved gas of the ink, and estimates the amount of dissolved gas of the ink based on each parameter. In addition, the determination part 39 stores conversion information indicating a correspondence relationship between the amount of dissolved gas of the ink and the allowable time, and the allowable time is set based on the amount of dissolved gas of the ink. The allowable time is a time during which the printing is allowed without degassing even if the ink is left. For the conversion information indicating the correspondence relationship between each parameter and the amount of dissolved gas of the ink and the conversion information indicating the correspondence relationship between the amount of dissolved gas of the ink and the allowable time, map data, a lookup table, a conversion equation, and the like are used. These map data, lookup table, and conversion equation are obtained experimentally, empirically, and theoretically in advance.

When the leaving time of the ink is within the allowable time, the determination part 39 determines that the degassing is unnecessary because an oxygen saturation degree is low. When the leaving time of the ink exceeds the allowable time, the determination part 39 determines that the degassing is necessary because the oxygen saturation degree is high. If the degassing is necessary, the control device 38 performs the pressure decreasing process and the degassing process described below.

[Pressure Decreasing Process] In the pressure decreasing process, the control device 38 closes the replenishment valve 51, the air release valve 53, the supply valve 54, the recovery valve 55, and the bypass valve 56, opens the pressure decreasing valve 52, and drives the pressure decreasing pump 62. Then, the air is sucked out from the upper space 34 of the ink tank 32, and the upper space 34 is decreased in pressure. The control device 38 stops the pressure decreasing pump 62 when the atmospheric pressure in the upper space 34 indicated by the barometer 33 reaches a target value (for example, −50 [kPa]).

[Degassing Process] When the pressure decreasing process is completed, the control device 38 performs the degassing process. In the degassing process, the control device 38 closes the replenishment valve 51, the pressure decreasing valve 52, the air release valve 53, the supply valve 54, the recovery valve 55, and the bypass valve 56, and drives the circulation pump 67 for a predetermined period. When the circulation pump 67 is driven, the ink in the ink tank 32 circulates through the circulation flow pass 47. The ink near the bottom surface of the ink tank 32 having a large amount of dissolved air flows out into the circulation flow pass 47 through the outlet port 71, and the ink in the circulation flow pass 47 flows into the vicinity of the liquid surface in the ink tank 32 through the inlet port 72. The liquid surface of the ink is exposed to the pressure decreased atmosphere to remove the air dissolved in the ink near the liquid surface. By smoothly replacing the ink near the liquid surface having a small amount of dissolved air with the ink near the bottom surface having a large amount of dissolved air, the degassing efficiency is improved. In addition, unlike the stirring degassing method, the depth of the ink and the tank diameter are not affected, and the driving sound of the circulation pump 67 is suppressed rather than the rotating sound of the stirrer, and the quietness is enhanced.

[Head Circulation Process] The head circulation process may be performed before or after the degassing process and may be performed at a unique timing. In the head circulation process, the control device 38 closes the replenishment valve 51, pressure decreasing valve 52, and the bypass valve 56, opens the air release valve 53, the supply valve 54, and the recovery valve 55, and drives the supply pump 64. Then, the ink is supplied from the ink tank 32 to the recording head 21 through the supply flow pass 44, and the ink is recovered from the recording head 21 to the ink tank 32 through the recovery flow pass 45. By circulating the ink between the recording head 21 and the ink tank 32, the ink with increased viscosity is replaced in the recording head 21 and bubbles are removed from the recording head 21.

[Print Process] In the printing operation by the recording head 21, the replenishment valve 51, the pressure decreasing valve 52 and the supply valve 54 are closed, and the air release valve 53, the recovery valve 55, and the bypass valve 56 are opened. That is, at the printing operation, the ink tank 32 is released to atmospheric pressure. During the printing operation, the ink tank 32 is not decreased in pressure, and substantial degassing does not occur. Every time when the ink is ejected from the recording head 21, the ink is supplied from the ink tank 32 to the recording head 21 through the bypass flow pass 46 and the recovery flow pass 45. In some cases, the ink is replenished in the middle of the ink replacement operation, the printing operation, and the like. During the ink replenishment operation, the replenishment valve 51 is opened and the replenishment pump 61 is driven. The ink is replenished from the ink container 31 to the ink tank 32 through the replenishment flow pass 41 by driving the replenishment pump 61.

FIG. 1 and the others are schematically drawn, and the recording head 21 is actually disposed above the ink tank 32. A negative pressure is applied to the ink in the recording head 21 by a head difference from the ink in the ink tank 32, and a meniscus is formed in the nozzle of the recording head 21 by the negative pressure. After the ink is ejected from the recording head 21, the surface tension of the ink acts to reduce the surface area of the meniscus, and the resulting negative pressure draws the reduced amount of the ink from the ink tank 32 into the recording head 21. The recovery valve 55 may be closed to supply the ink to the recording head 21 only from the bypass flow pass 46.

If the ink tank 32 is decreased in pressure to the extent that substantial degassing occurs in a state where the recording head 21 and the ink tank 32 are connected, the meniscus in the nozzle may be destroyed. Even if the meniscus is not destroyed, there is a risk that the shape of the meniscus in the nozzle changes from that when the ink tank 32 is released to the atmosphere, and the ejection characteristics of the ink may be changed. In the present embodiment, since the ink tank 32 is not decreased in pressure so as to cause the substantial degassing during the printing operation, the meniscus in the nozzle of the recording head 21 is not destroyed, and the shape is not changed and the ejection characteristic is not changed.

Figure 6:
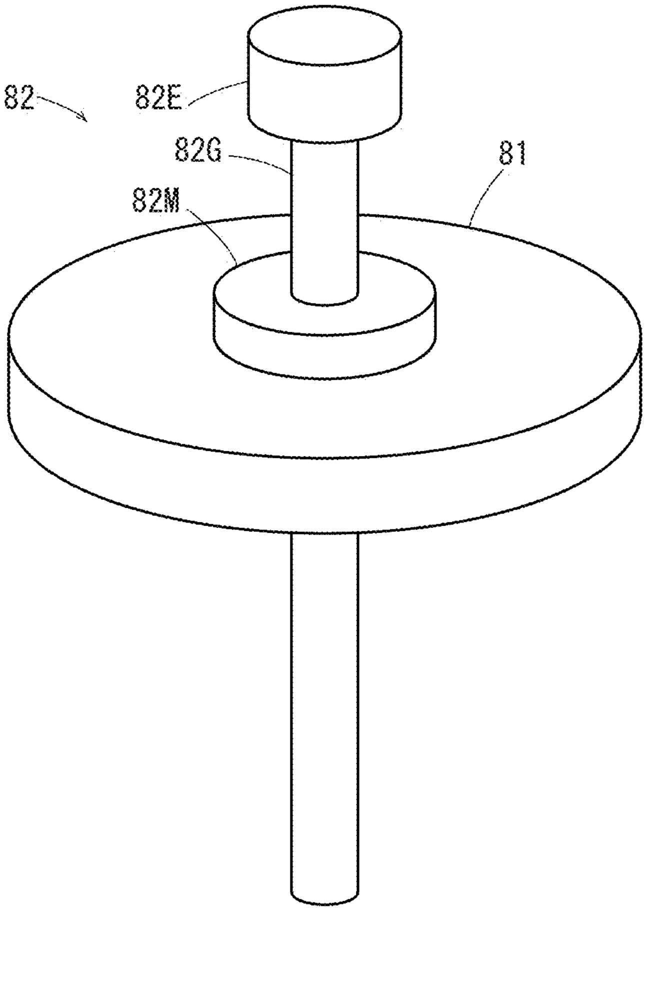
FIG. 6 is a perspective view showing a floating body and a lifting mechanism according to the embodiment of the present disclosure.

Next, the features of this embodiment will be described in detail. FIG. 6 is a perspective view showing a floating body 81 and the lifting device 82.

The degassing device 40 according to the present embodiment removes the air dissolved in a liquid (for example, the ink) under a pressure decreased atmosphere, and includes the liquid tank (for example, the ink tank 32), the pressure decreasing device (for example, the pressure decreasing pump 62), a dipping member (for example, a floating member 81), and a lifting device 82. The liquid tank stores the liquid. The pressure decreasing device decreases the pressure of the inside of the liquid tank. The dipping member is dipped in the liquid in the liquid tank. The lifting device 82 lifts and lowers the dipping member in a dipping state for positioning the dipping member on the liquid surface in the liquid tank, and a retracted state for retracting the dipping member from the liquid surface in the liquid tank. The dipping state also includes a state in which the lower end of the dipping member is in contact with the liquid surface. In the state where the dipping member is positioned on the liquid surface of the liquid in the liquid tank, the liquid surface is positioned at any positions from the lower end of the dipping member to the upper end of the dipping member. In another expression, in the state where the dipping member is positioned on the liquid surface of the liquid in the liquid tank, a part of the dipping member is dipped in the liquid in the liquid tank and the whole dipping member is not dipped in the liquid in the liquid tank. Specifically, they are as follows. Since the ink tank 32 and the pressure decreasing pump 62 are described above, the floating body 81 and the lifting device 82 will be described below.

[Floating Body] The floating body 81 has a unit volume mass smaller than that of the ink. The floating body 81 is formed in a plate shape of a size smaller than the horizontal cross section of the inner surface of the side wall portion 32W. In this embodiment, since the horizontal cross section of the inner surface of the side wall portion 32W is circular, the floating body 81 is also formed in a circular plate shape. The outer diameter of the floating body 81 is smaller than the inner diameter of the side wall portion 32W. A through-hole 81H is provided at the center of the floating body 81.

[Lifting Device] The lifting device 82 includes a guide part 82G, a magnetic body 82M, and an electromagnet 82E. The guide part 82G is a rod-shaped member whose longitudinal direction is along the upper-and-lower direction. The upper end portion of the guide part 82G is fixed to the lower surface of the lid body portion 32C. The lower end portion of the guide part 82G may be fixed to the bottom portion 32B of the ink tank 32, and a gap (not shown) may be provided between the lower end portion of the guide part 82G and the bottom portion 32B. The guide part 82G is inserted into the through-hole 81H of the floating body 81. The floating body 81 can slide along the guide part 82G. The electromagnet 82E is provided at the upper end portion of the guide part 82G. On the upper surface of the floating body 81, a magnetic body 82M (ferromagnetic body) is provided which is attracted by the electromagnet 82E and moves. A gap G is formed between the inner surface of the side wall portion 32W of the ink tank 32 and the outer edge of the floating body 81 over the entire circumference. The gap G reduces the contact between the floating body 81 and the side wall portion 32W when the floating body 81 is lifted and lowered.

The electromagnet 82E is controlled by the control device 38. When the control device 38 does not apply power to the electromagnet 82E (see FIG. 4), the floating body 81 floats on the liquid surface and the lower portion of the floating body 81 is dipped in the liquid (the dipping state). When the control device 38 applies power to the electromagnet 82E (see FIG. 5), the magnetic body 82M is attracted to the electromagnet 82E and moves, so that the floating body 81 retracts upward from the liquid surface (the retracted state). The magnetized magnetic body 82M may be used to move the magnetic body 82M using a repulsive force.

In the standby state, the pressure decreasing process, the head circulation process and the printing process, the control device 38 moves the floating body 81 to the dipping state. In this case, since the liquid surface is formed only inside the gap G, the re-dissolution of the air is suppressed.

On the other hand, in the degassing process, the control device 38 moves the floating body 81 to the retracted state. In this case, since the liquid surface spreads to the whole inside of the side wall portion 32W, the lowering of the degassing efficiency by the floating body 81 can be prevented.

Figure 7:
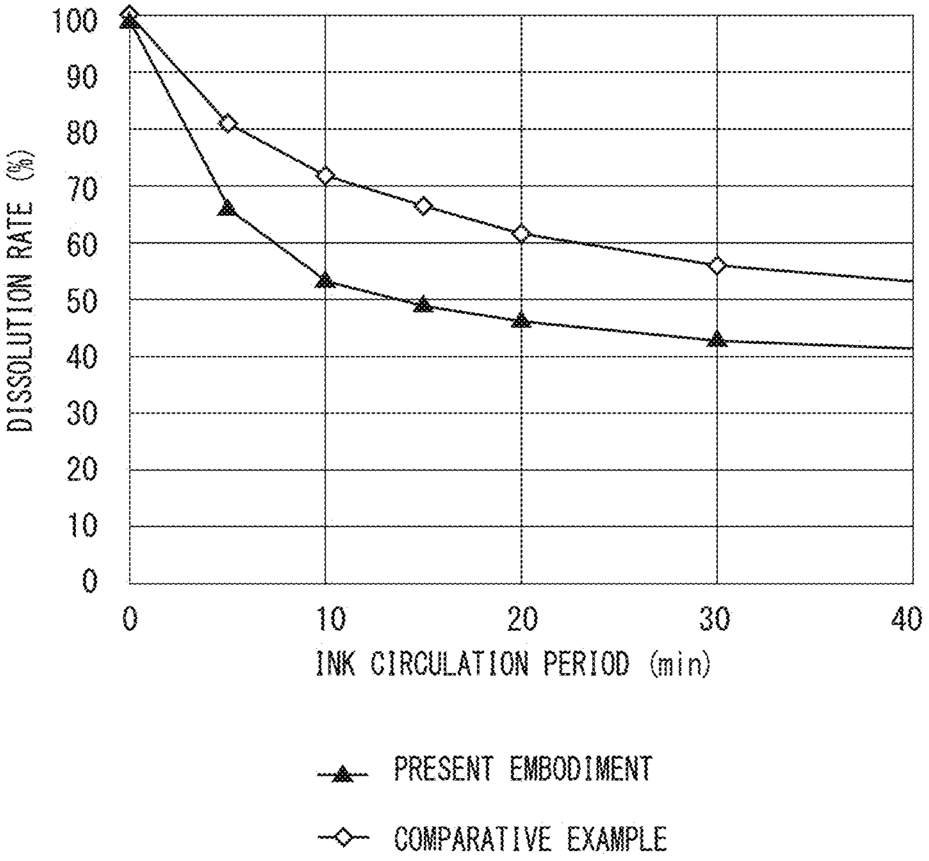
FIG. 7 is a view showing a result of circulation degassing performed by the embodiment of the present disclosure and a comparative configuration.

[Experiment] FIG. 7 is a view showing the results of the circulation degassing. A comparative example has a configuration in which the floating body 81 is not moved to the retracted state in the degassing process but remains floating on the liquid surface. The viscosity of the ink is 7 [mPa·s], the temperature of the ink is 25 [° C.], the tank diameter of the ink tank 32 is 60 [mm], the depth of the ink is 28 [mm], and the circulation flow rate of the ink is 770 [ml/min], and the change in the oxygen dissolution rate with time is compared. The vertical axis shows the oxygen dissolution rate [%], and the horizontal axis shows the ink circulation period [min]. The dissolution rate represents the ratio to the dissolved oxygen amount at saturation, and the initial value is 100 [%]. As can be seen from the drawing, compared with the comparative example, the trend of decrease in the dissolution rate in the present embodiment is remarkable from the initial stage, and decreases to 50% after about 14 minutes elapses. On the other hand, in the comparative example, it does not reach 50% even after 40 minutes elapses.

According to the degassing device 40 of the present embodiment described above, the degassing device 40 removes the air dissolved in the liquid (for example, the ink) under the pressure decreased atmosphere. The degassing device 40 includes the liquid tank (for example, the ink tank 32), the pressure decreasing device (for example, the pressure decreasing pump 62), the dipping member (for example, the floating body 81), and the lifting device 82. The liquid tank stores the liquid. The pressure decreasing device decreases the pressure in the liquid tank. The dipping member is dipped in the liquid in the liquid tank. The lifting device 82 lifts and lowers the dipping member in the dipping state for positioning the dipping member on the liquid surface in the liquid tank, and the retracted state for retracting the dipping member from the liquid surface in the liquid tank. According to this configuration, the re-dissolution of the air can be suppressed without lowering the degassing efficiency.

In addition, according to the degassing device 40 of the present embodiment, the lifting device 82 retracts the dipping member above the liquid surface in the liquid tank in the retracted state. For example, it is assumed that the inkjet recording apparatus 1 is set such that printing can continue using the ink in the ink tank 32 even if the ink container 31 becomes empty. In this case, since the liquid surface in the ink tank 32 is lowered from the normal height by the continuous printing, it is considered that it is impossible to retract the dipping member downward depending on the height of the liquid surface. On the other hand, in the present embodiment, since the dipping member is retracted upward, the dipping member can be retracted from the liquid surface even when the liquid surface is lowered. Therefore, according to the present embodiment, even when the degassing is performed in the state where the liquid level is lowered, the degassing efficiency can be prevented from being lowered.

According to the degassing device 40 of the present embodiment, the dipping member is a floating body 81. According to this configuration, since the driving force for dipping the dipping member in the liquid is unnecessary, the configuration can be simplified. It also saves energy.

According to the degassing device 40 of the present embodiment, the lifting device 82 includes the electromagnet 82E, and the floating body 81 includes the magnetic body 82M moved by the electromagnet 82E. According to this configuration, the floating body 81 can be retracted in a simple configuration.

According to the degassing device 40 of the present embodiment, the degassing device 40 includes the circulation flow pass 47 which communicates different positions of the liquid tank and the circulation device (the circulation pump 67) which circulates the liquid through the circulation flow pass 47. According to this configuration, the replacement of the liquid having a large amount of dissolved air near the bottom surface of the liquid tank with the liquid having a small amount of dissolved air near the liquid surface can be promoted, so that the degassing efficiency can be improved even when the amount of liquid is large.

The inkjet recording apparatus 1 according to the present embodiment is provided with the degassing device 40 and the recording head 21 which ejects the liquid degassed by the degassing device 40 to the sheet S. According to this configuration, the deterioration of image quality caused by the generation of bubbles can be suppressed.

The above embodiment may be modified as follows.

Figure 8:
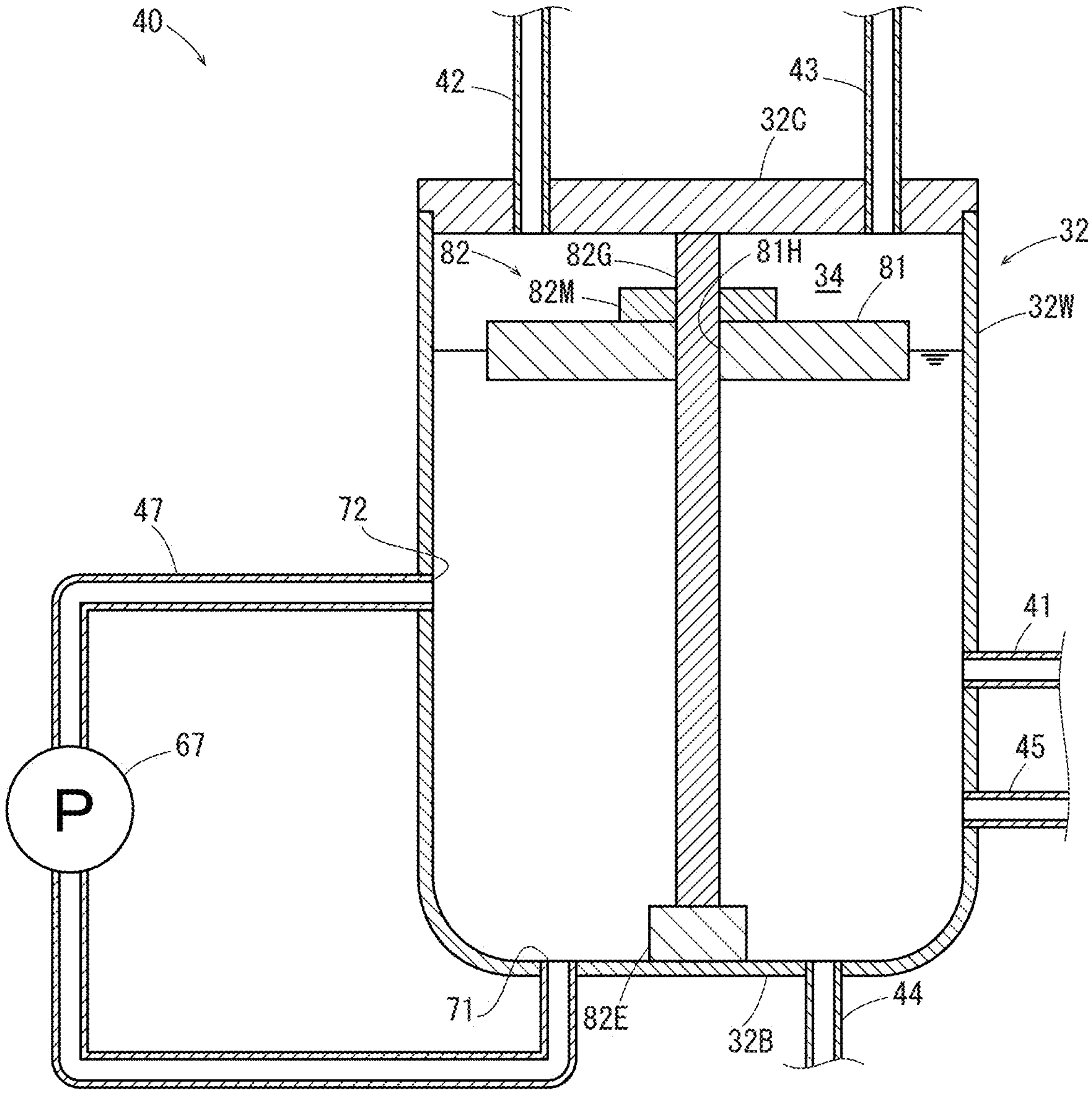
FIG. 8 is a sectional view showing the degassing device according to a first modified example of the embodiment of the present disclosure.
Figure 9:
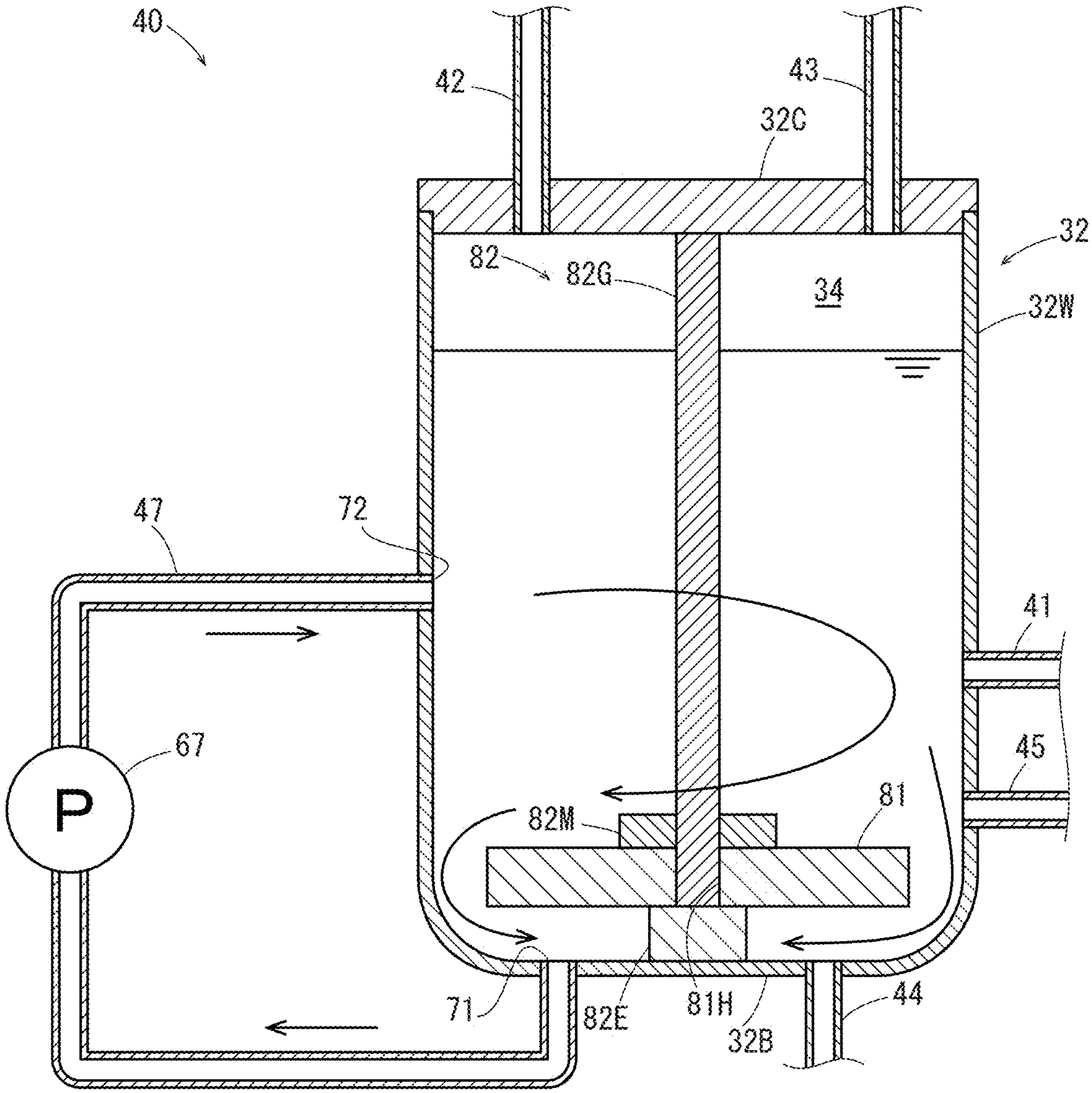
FIG. 9 is a sectional view showing the degassing device according to the first modified example of the embodiment of the present disclosure.
Figure 10:
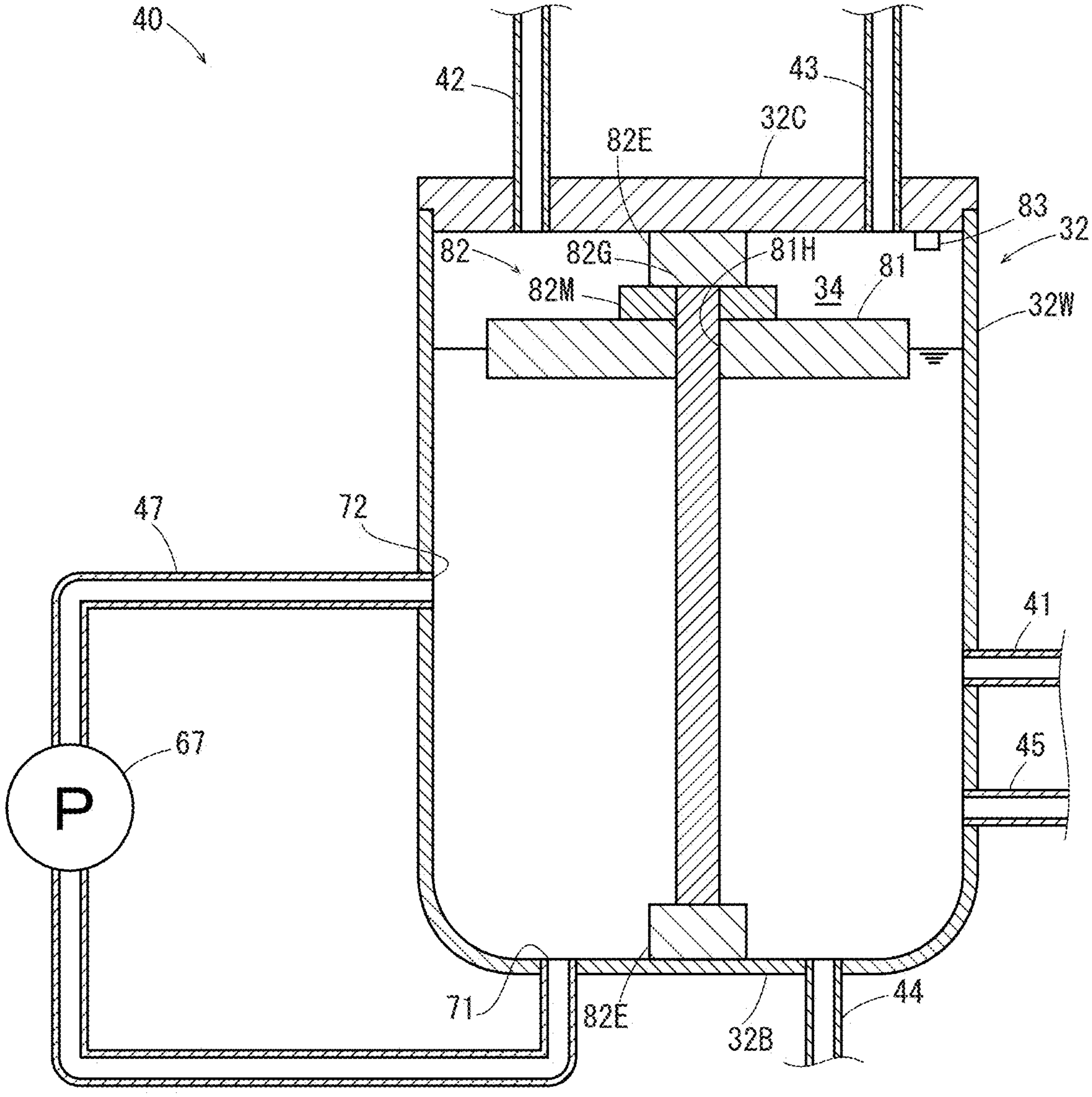
FIG. 10 is a sectional view showing the degassing device according to a second modified example of the embodiment of the present disclosure.

[First Modified Example] FIG. 8 and FIG. 9 are cross-sectional views showing the degassing device 40 according to the first modified example of the above embodiment. The above embodiment shows an example in which the lifting device 82 retracts the dipping member above the liquid surface in the liquid tank in the retracted state, but in the present modified example, the lifting device 82 retracts the dipping member below the liquid surface in the liquid tank in the retracted state. For example, assume that the inkjet recording apparatus 1 is set to perform the image forming operation in a state where the ink tank 32 is nearly full (see FIG. 8). In this case, depending on the height of the liquid surface, it is considered that it is impossible to retract the dipping member upward. On the other hand, in the present modified example, since the electromagnet 82E is provided in the lower end portion of the guide part 82G to retract the dipping member downward (see FIG. 9), the dipping member can be retracted from the liquid surface even when the ink tank 32 is nearly full. Therefore, according to the present modified example, even when the ink tank 32 is degassed in a state almost being full, the degassing efficiency can be prevented from being lowered.

[Second Modified Example] FIG. 10 to FIG. 13 are cross-sectional views showing the degassing device 40 according to the second modified example of the above embodiment. In this modified example, the degassing device 40 is provided with a detection device 83 which detects the height of the liquid surface in the liquid tank, and in the retracted state, the lifting device 82 retracts the dipping member either upward or downward according to the height of the liquid surface in the liquid tank detected by the detection device 83. Specifically, the electromagnets 82E are provided at the upper end portion and the lower end portion of the guide part 82G. The detection device 83 is provided, for example, on the lower surface of the lid body portion 32C, irradiates the floating body 81 or the liquid surface with light, and calculates the distance between the liquid surface using the phase difference between the incident light and the reflected light.

Figure 11:
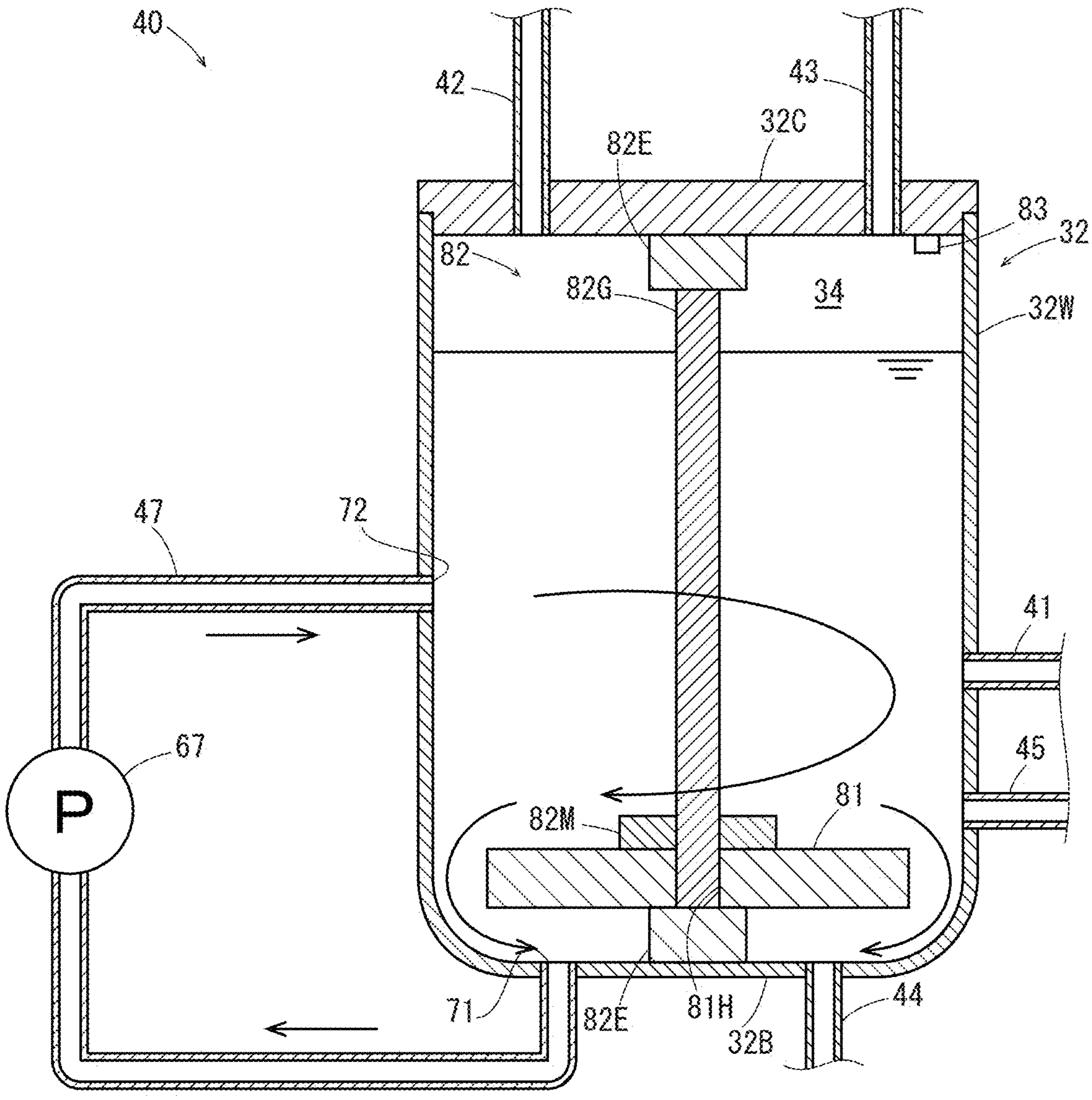
FIG. 11 is a sectional view showing the degassing device according to the second modified example of the embodiment of the present disclosure.
Figure 12:
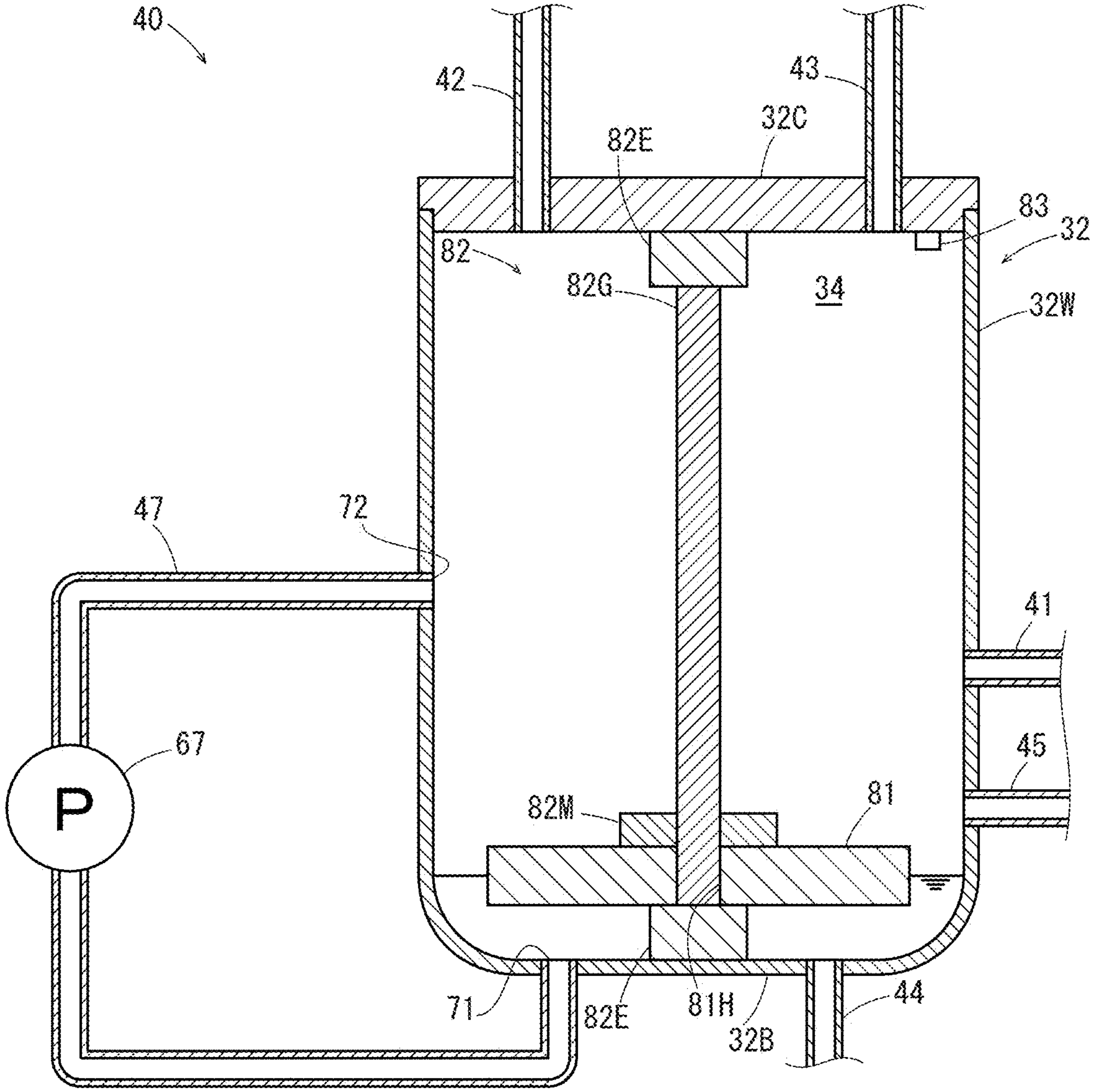
FIG. 12 is a sectional view showing the degassing device according to the second modified example of the embodiment of the present disclosure.
Figure 13:
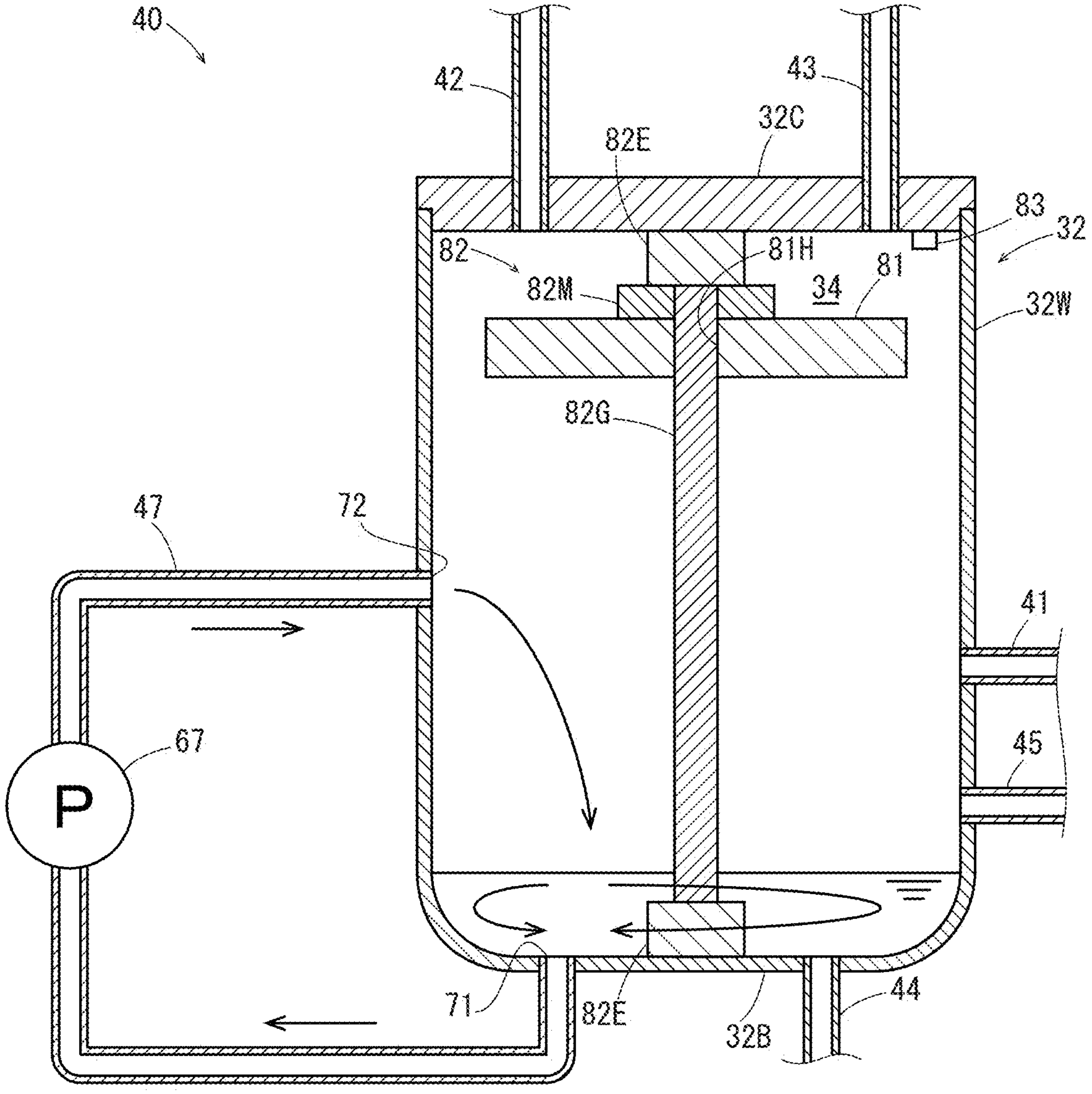
FIG. 13 is a sectional view showing the degassing device according to the second modified example of the embodiment of the present disclosure.

When the height of the liquid surface detected by the detection device 83 is such that it is impossible to retract the dipping member upward (see FIG. 10), the control device 38 retracts the dipping member downward by applying power to the lower electromagnet 82E (see FIG. 11). On the other hand, when the height of the liquid surface detected by the detection device 83 is such that it is impossible to retract the dipping member downward (see FIG. 12), the control device 38 applies power to the upper electromagnet 82E to retract the dipping member upward (see FIG. 13). According to the present embodiment, the degassing efficiency can be prevented from being lowered regardless of the height of the liquid surface.

Figure 14:
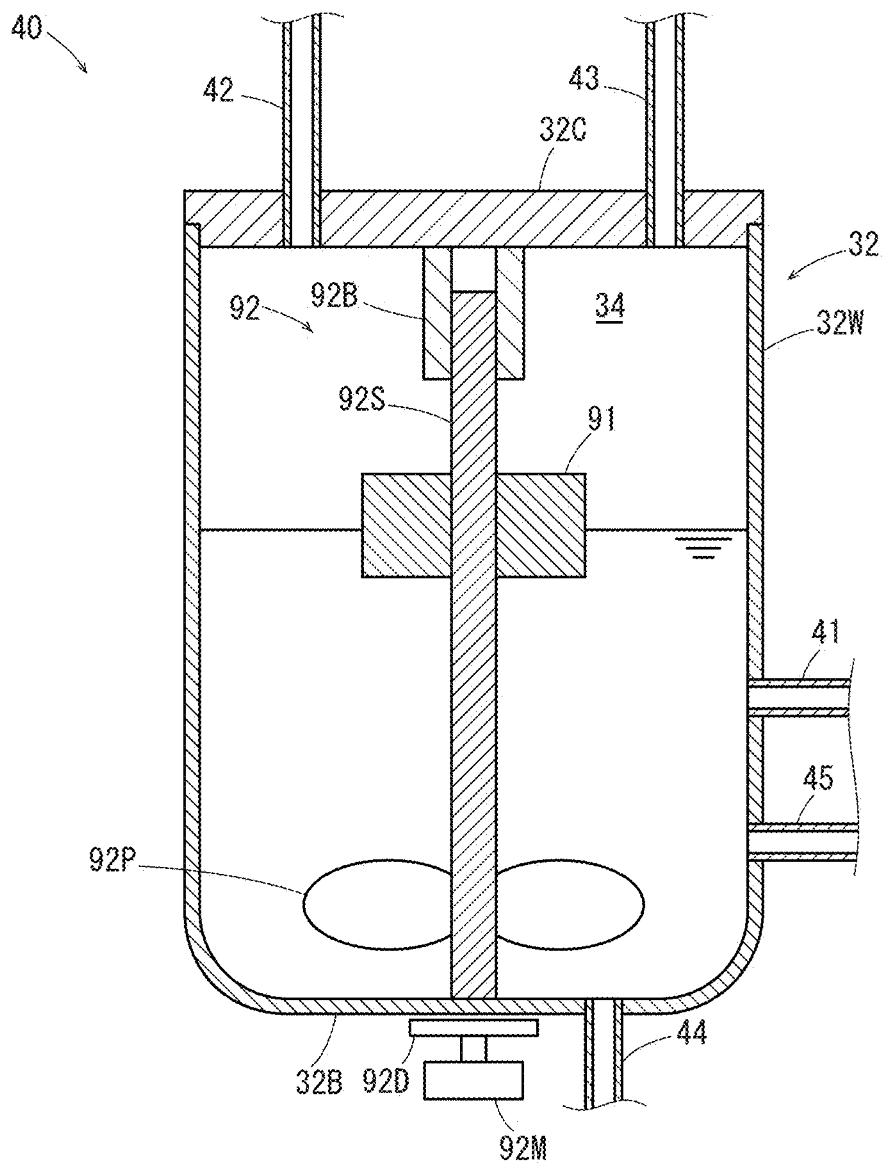
FIG. 14 is a sectional view showing the degassing device according to a third second modified example of the embodiment of the present disclosure.
Figure 15:
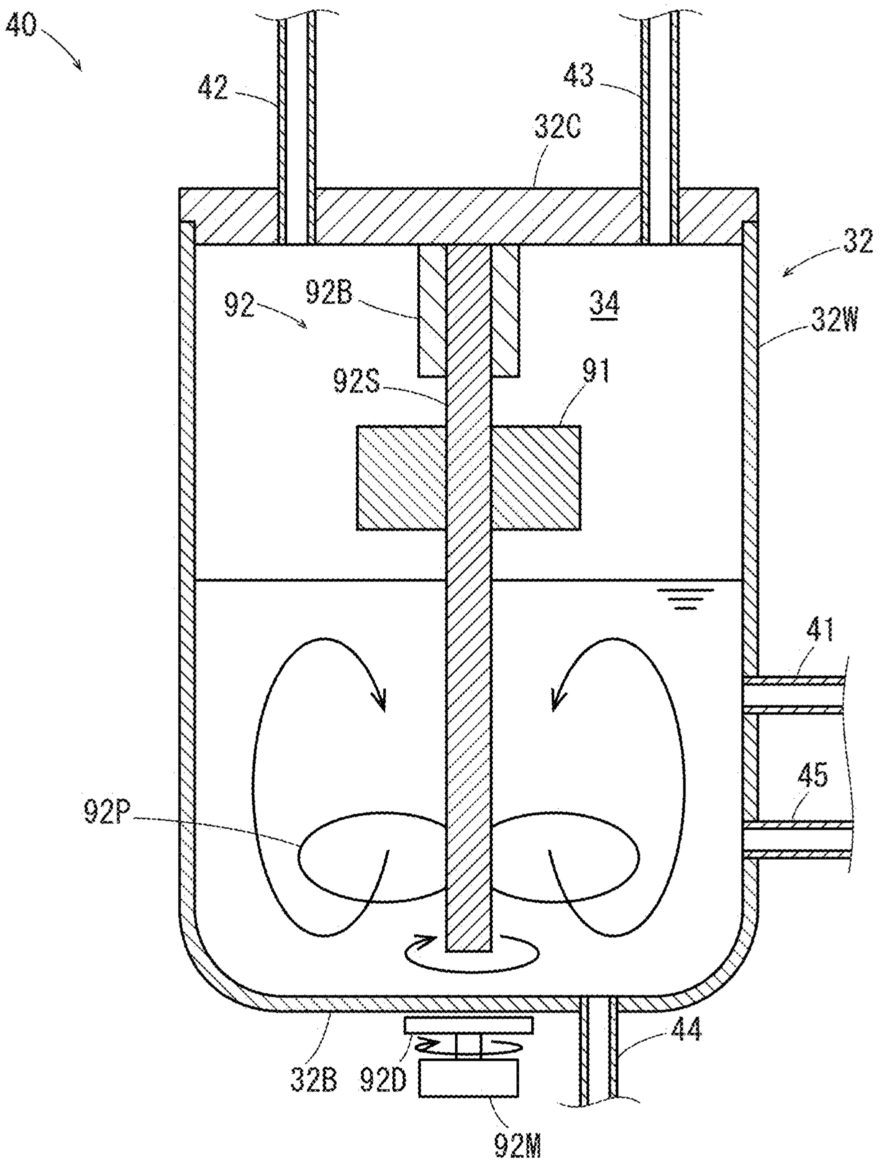
FIG. 15 is a sectional view showing the degassing device according to the third modified example of the embodiment of the present disclosure.

[Third Modified Example] FIG. 14 and FIG. 15 are cross-sectional views showing the degassing device 40 according to the third modified example of the above embodiment. The lifting device 92 is provided with a shaft 92S provided along the upper-and-lower direction and slidable in the upper-and-lower direction, and a propeller 92P provided on the shaft 92S. The dipping member is a large diameter portion 91 provided in the shaft 92S above the propeller 92P and larger in diameter than the shaft 92S. The dipping member is in the dipping state when the propeller 92P is not driven, and is in the retracted state when the propeller 92P is driven in the direction of pushing the liquid downward.

Specifically, the lid body portion 32C is provided with a cylindrical bearing 92B for supporting the upper end portion of the shaft 92S. The shaft 92S can slide in the upper-and-lower direction with respect to the bearing 92B. The propeller 92P is made of, for example, ferromagnetic material. A permanent magnet 92M and a motor 92D for rotating the permanent magnet 92M are provided outside the bottom portion 32B of the ink tank 32.

The propeller 92P is constrained by the magnetic field generated by the permanent magnet 92M. Since the magnetic field rotates with the rotation of the permanent magnet 92M, the propeller 92P also rotates. The propeller 92P generates thrust in the direction in which the shaft 92S is pushed upward (the direction in which the liquid is pushed downward). The large diameter portion 91 is formed in a size smaller than the horizontal cross section of the inner surface of the side wall portion 32W. In this embodiment, since the horizontal cross section of the inner surface of the side wall portion 32W is circular, the large diameter portion 91 is also formed in a circular plate shape. The outer diameter of the large diameter portion 91 is smaller than the inner diameter of the side wall portion 32W.

If the control device 38 does not rotate the propeller 92P (see FIG. 14), the shaft 92S is lowered by the action of gravity, and the lower end of the shaft 92S is in contact with the upper surface of the bottom portion 32B. In this case, since the large diameter portion 91 is in the dipped state, the liquid surface becomes narrow. On the other hand, when the control device 38 rotates the propeller 92P (see FIG. 15), the shaft 92S is pushed upward by the thrust generated by the propeller 92P, and the upper end of the shaft 92S is in contact with the lower surface of the lid body portion 32C. In this case, since the large diameter portion 91 is in the retracted state, the liquid surface becomes wider. Although the propeller 92P is provided to stir the liquid to promote the degassing, in the present modified example, since the dipping member is retracted by using the driving force of the propeller 92P, the dedicated driving force for retracting the dipping member is unnecessary.

[Additional Modified Example] In the above embodiment, an example in which the degassing device 40 is provided in the inkjet recording apparatus 1 is shown, but the degassing device 40 can also be applied to devices used in other fields such as semiconductor manufacturing fields and display manufacturing fields. That is, it can be applied to degassing of chemical solutions, electrolytic solutions, liquid resins, adhesives, solvents, lubricating oils, liquid foods, serum, or the like, other than the ink.

In the above embodiment, an example in which the pressure decreasing pump 62 is used as a pressure decreasing device is shown, but the pressure decreasing device may be a device capable of reducing pressure in the ink tank 32, and for example, the pressure decreasing device may be an ejector.

In the above embodiment, an example in which the circulation pump 67 is used as a circulation device is shown, but the circulation device may be a device capable of circulating the ink through the circulation flow pass 47, and for example, the circulation device may be an ejector.

The invention claimed is:

1. A degassing device which removes air dissolved in liquid under a pressure decreased atmosphere, the degassing device comprising:
- a liquid tank in which the liquid is stored;
- a pressure decreasing device which decreases pressure in the liquid tank;
- a dipping member dipped in the liquid in the liquid tank; and
- a lifting device which lifts and lowers the dipping member in a dipping state where the dipping member is positioned on a liquid surface of the liquid in the liquid tank and a retracted state where the dipping member is retracted from the liquid surface of the liquid tank.

2. The degassing device according to claim 1, wherein, the lifting device retracts the dipping member above the liquid surface of the liquid tank in the retracted state.

3. The degassing device according to claim 2, wherein the lifting device includes:

a shaft provided along an upper-and-lower direction and slidable in the upper-and-lower direction; and a propeller provided in the shaft, the dipping member is a large diameter portion provided in the shaft above the propeller and having a diameter larger than that of the shaft, and the dipping member is in the dipping state when the propeller is not driven and in the retracted state when the propeller is driven in a direction in which the liquid is pushed downward.

4. The degassing device according to claim 1, wherein, the lifting device retracts the dipping member below the liquid surface of the liquid tank in the retracted state.

5. The degassing device according to claim 1, comprising:

a detection device which detects a height of the liquid surface in the liquid tank, wherein the lifting device retracts the dipping member above or below the liquid surface in the liquid tank depending on the height of the liquid surface in the liquid tank detected by the detection device in the retracted state.

6. The degassing device according to claim 1, wherein the dipping member is a floating body.

7. The degassing device according to claim 6, wherein the lifting device includes an electromagnet, and the floating body includes a magnetic body moved by the electromagnet.

8. The degassing device according to claim 6, comprising a circulation flow pass which communicates different positions of the liquid tank, and a circulation device which circulates the liquid through the circulation flow pass.

9. An inkjet recording apparatus comprising:

the degassing device according to claim 1, and a recording head which ejects the liquid degassed by the degassing device, to a sheet.

* * * * *